(12) United States Patent
Park

(10) Patent No.: US 10,401,239 B2
(45) Date of Patent: Sep. 3, 2019

(54) INTEGRATED HYPER-REDUNDANT TACTILE SENSOR NETWORK BASED ON STRUCTURAL FIBERS

(71) Applicant: The Boeing Company, Chicago, IL (US)

(72) Inventor: Daniel Park, Wentzville, MO (US)

(73) Assignee: THE BOEING COMPANY, Chicago, IL (US)

(*) Notice: Subject to any disclaimer, the term of this patent is extended or adjusted under 35 U.S.C. 154(b) by 125 days.

(21) Appl. No.: 15/340,544

(22) Filed: Nov. 1, 2016

(65) Prior Publication Data

US 2018/0120173 A1    May 3, 2018

(51) Int. Cl.
*G01L 1/14*        (2006.01)
*G01L 1/20*        (2006.01)
(Continued)

(52) U.S. Cl.
CPC ............ *G01L 1/205* (2013.01); *G01L 1/2287* (2013.01); *G01M 5/0016* (2013.01);
(Continued)

(58) Field of Classification Search
CPC ......... G01L 1/205; G01L 1/2287; G01L 1/16; G01M 5/0016; G01M 5/0033; G01M 5/0041; G01M 5/0083; G01M 11/086; G01N 27/00; G01R 27/08; G06F 3/041; G06F 11/30; G01B 7/16
See application file for complete search history.

(56) References Cited

U.S. PATENT DOCUMENTS 4,649,752 A    3/1987  Turner
4,822,113 A    4/1989  Amberg et al.
(Continued)

FOREIGN PATENT DOCUMENTS

DE    102008058882 A1    10/2010
WO    2011002689 A1      1/2011
WO    2016159245 A1      10/2016

OTHER PUBLICATIONS

Obitayo, W., et al., A Review: Carbon Nanotube-Based Piezoresistive Strain Sensors, Journal of Sensors, 2012.
(Continued)

*Primary Examiner* — Harshad R Patel
*Assistant Examiner* — Nigel H Plumb
(74) *Attorney, Agent, or Firm* — Toler Law Group, P.C.

(57) ABSTRACT

A system and method are disclosed for measuring stress in a composite structure including an integral sensor network. The composite structure is formed in layers with each of the layers formed from parallel fibers. At least one of the layers includes a plurality of fiber sensor cells distributed among the parallel fibers. Each of the fiber sensor cells has an inner fiber core and a non-conductive layer formed over the inner fiber core. A controller is electrically coupled to each of the fiber sensor cells and configured to determine a level of stress in the composite structure based on a change in a resistance level of the inner fiber core of each of the fiber sensor cells. The fiber sensor cells may be in a single direction or may be in a weave pattern with a first group arranged at a non-zero angle with respect to a second group.

20 Claims, 5 Drawing Sheets

(51) Int. Cl.
*G01L 1/22* (2006.01)
*G01M 5/00* (2006.01)

(52) U.S. Cl.
CPC ........ *G01M 5/0033* (2013.01); *G01M 5/0041* (2013.01); *G01M 5/0083* (2013.01)

(56) References Cited

U.S. PATENT DOCUMENTS

| | | | |
|---|---|---|---|
| 5,000,037 | A | 3/1991 | Baresh |
| 6,399,939 | B1 | 6/2002 | Sundaresan et al. |
| 7,552,644 | B2 | 6/2009 | Haase et al. |
| 7,819,025 | B2 | 10/2010 | Coffland |
| 7,876,216 | B2 | 1/2011 | Coffland et al. |
| 8,253,696 | B2 * | 8/2012 | Antaki ................. G06K 9/0002 178/18.06 |
| 8,294,571 | B2 | 10/2012 | Coffland et al. |
| 8,311,658 | B2 | 11/2012 | Coffland et al. |
| 8,451,013 | B1 | 5/2013 | Hsiao |
| 9,170,172 | B2 | 10/2015 | Hunt et al. |
| 2007/0100582 | A1 * | 5/2007 | Griess ................. G01M 5/0033 702/183 |
| 2014/0260653 | A1 * | 9/2014 | Merrell ................. G01L 1/16 73/774 |
| 2016/0077027 | A1 | 3/2016 | Sweers et al. |
| 2016/0214735 | A1 | 7/2016 | Garcia et al. |

OTHER PUBLICATIONS

Alamusi et al., Piezoresistive Strain Sensors Made from Carbon Nanotubes Based Polymer Nanocomposites, Sensors, 2011.

Nauman, S., et al., Simultaneous Application of Fibrous Piezoresistive Sensors for Compression and Traction Detection in Glass Laminate Composites, Sensors, 2011.

Yang, C.Q., et al., Linear strain sensing performance of continuous high strength carbon fibre reinforced polymer composites, Composites, vol. 102, Oct. 1, 2016.

Kang, L, et al., A carbon nanotube stain sensor for structural health monitoring, Smart Materials and Structures, 2006, pp. 737-748.

Abot, J.L., et al., Delamination Detection with carbon nanotube thread in self-sensing composite materials, Composites Science and Technology, 70 (2010), pp. 1113-1119.

Mar. 18, 2018 Extended European Search Report for Application No. EP 17 19 5593.

Scholz, P., et al., "Performance Optimization of Jet Actuator Arrays for Active Flow Control," in CEAS/KATnet Conference on Key Aerodynamic Technologies, Bremen, Jun. 2005, 11 pages.

Liu, Y., et al., "Integrated Flight Control and Flow Control Using Synthetic Jet Arrays," in AIAA Guidance, Navigation, and Control Conference and Exhibit, Keystone, Colorado, Aug. 21-24, 2006, 20 pages.

Smith, B.L., et al., "Vectoring of Adjacent Synthetic Jets," AIAA Journal, vol. 43, No. 10, Oct 2005, pp. 2117-2124.

Communication pursuant to Article 94(3) EPC for application No. 17195593.3 dated Dec. 17, 2018.

Summons to attend oral proceedings pursuant to Rule 115(1) dated Jul. 4, 2019, 6 pgs.

* cited by examiner

INTEGRATED HYPER-REDUNDANT TACTILE SENSOR NETWORK BASED ON STRUCTURAL FIBERS

FIELD

This disclosure relates to a hyper-redundant tactile sensor network and to methods of forming such sensor network, and more particularly to a hyper-redundant tactile sensor network based on structural fibers that may be incorporated into the structure of an underlying vehicle such as an aircraft.

BACKGROUND

Many structures incorporate a distributed network of sensors in order to successfully fulfill their function. For example, structural health monitoring (SHM) systems may use sensors distributed about a structure. SHM systems can provide the ability to detect and interpret any changes in a structure that may relate to in-use stresses and/or permanent damage thereof. SHM systems may utilize non-invasive detection sensors that are integrated into a structure to continuously monitor components for such changes.

Composite structures are structures consisting of two or more components often with some imparted order which are utilized in a wide variety of applications. For example, air vehicles, such as aircraft, spacecraft or the like, may utilize composite structures in order to take advantage of the benefits attributable to the increased strength-to-weight ratio offered by composite materials. Other applications that may include composite structures include other types of vehicles, such as automobiles, marine vehicles, bicycles and the like, as well as a wide variety of other structures, such as buildings, bridges, etc. Composite structures may also be produced and used with additional functionalities including altered thermal, electrical, acoustical, or mechanical properties by suitably modifying the materials used, the structure itself, or the process used to produce the structure.

Composite structures may be fabricated in various manners designed to impart a predetermined order to a plurality of elements dispersed within a resin or other mostly continuous medium, e.g., polymer, glass, or cement. Typically, a composite structure includes a plurality of structural fibers, such as glass fibers or other elements including carbon fibers, metalized carbon fibers, metal or polymer sheets, carbon or polymer veils, pre-impregnated composite sheets, woven sheets of fibers, mats of random or organized fibers, metal or polymer meshes, embedded in a resin matrix. The resin matrix may be any one of many thermoplastic or thermoset polymer combinations, adhesives or other bonding materials, or cement. Once the composite structure has been laid up, such as by placing a plurality of composite plies one upon another or by laying a plurality of composite tows one beside another, in a manner so as to have the desired shape or woven into a predetermined two-dimensional or three-dimensional structure, the composite structure may be cured, melted or bonded in one or more processing steps.

Implementing an SHM system into a composite structure can provide immediate feedback on in-use stresses and/or permanent damage thereof. However, such a system may add weight and weaken the structural integrity of the composite structure. For example, an SHM system may utilize various sensors (such as strain gauges, thermocouples and optical fibers) permanently mounted in regions of interest. The number and location of these sensors may be limited due to required infrastructure. These concerns may be further exacerbated when the SHM system is operated in a harsh environment, such as the extreme temperatures, shock, vibration and g-loading experienced by aircraft.

Accordingly, there is a need for a structural health monitoring system and methods of forming such system which overcomes the problems recited above.

SUMMARY

In a first aspect, a composite structure includes an integral sensor network. The composite structure is formed in layers, with each of the layers formed from parallel fibers. At least one of the layers includes a plurality of fiber sensor cells distributed among the parallel fibers. Each of the fiber sensor cells has an inner fiber core and a non-conductive layer formed over the inner fiber core.

In one further embodiment, each of the plurality of fiber sensor cells is oriented in a single direction parallel to each other of the plurality of fiber sensor cells. Further, each of the plurality of fiber sensor cells may have a first connection terminal at a first end thereof connected to a first end of the corresponding inner fiber core and a second connection terminal at a second end thereof connected to a second end of the corresponding inner fiber core. All of the plurality of fiber sensor cells may be electrically coupled in parallel by electrically connecting each of the first connection terminals to each other of the first connection terminals and by electrically connecting each of the second connection terminals to each other of the second connection terminals.

In another further embodiment, each fiber sensor cell in a first group of the plurality of fiber sensor cells may be oriented in a first direction parallel to each other of the plurality of fiber sensor cells in the first group and each fiber sensor cell in a second group of the plurality of fiber sensor cells may be oriented in a second direction parallel to each other of the plurality of fiber sensor cells in the second group. Further, the first direction may be at a non-zero angle with respect to the second direction. Still further, the plurality of fiber sensor cells may be arranged in a manner that allows the identification and quantification of stress locations in the composite structure.

In an embodiment, the inner fiber core may be carbon or boron, and the non-conductive layer may be glass. The composite structure may be a skin for an aircraft wing or a portion of a gripper for a robotic arm.

In a second aspect, a system is described that measures stress in a composite structure including an integral sensor network. A composite structure is formed in layers, with each of the layers formed from parallel fibers. At least one of the layers includes a plurality of fiber sensor cells distributed among the parallel fibers. Each of the fiber sensor cells has an inner fiber core and a non-conductive layer formed over the inner fiber core. A controller is electrically coupled to each of the fiber sensor cells and is configured to determine a level of stress in the composite structure based on a change in a resistance level in the inner fiber core of each of the fiber sensor cells.

In a third aspect, a method of measuring stress in a composite structure including an integrated sensor network is described. The composite structure is formed in layers, with each of the layers formed from parallel fibers. At least one of the layers includes a plurality of fiber sensor cells distributed among the parallel fibers. Each of the fiber sensor cells has an inner fiber core and a non-conductive layer formed over the inner fiber core. A resistance level of the inner fiber core of each of the fiber sensor cells is monitored.

A level of stress in the composite structure is determined based on a change in the resistance level in the inner fiber core of each of the fiber sensor cells. The stress level may be determined based on a parallel combination of the resistance levels of each of the inner fiber cores of the fiber sensor cells.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Carbon-graphite fibers, carbon-nanotube fibers, boron-nanotube fibers, and boron-nitride-nanotube fibers and structures formed therefrom have a high stiffness, high tensile strength, low weight, high chemical resistance, high temperature tolerance and low thermal expansion. This makes composite structures formed from carbon-graphite fibers, carbon-nanotube fibers, boron-nanotube fibers, and boron-nitride-nanotube fibers popular for use in aerospace, civil engineering, military, and motorsport applications.

The present disclosure describes an integrated hyper-redundant tactile sensor system formed from a plurality of carbon or boron fiber sensor cells having a coaxial structure including an inner fiber core that acts as the sensing element and an outer non-conductive layer that is formed over the inner fiber core. By forming a composite fiber structure, at least in part, from a plurality of such fiber sensor cells (e.g., in parallel or in a woven pattern), the resultant structure will have all the benefits recited above of a composite structure (since the core of each fiber sensor cell is a carbon or boron fiber) and will also include an integrated sensor system. This is quite different from a structure formed in layers, with a conventional sensor, such as a strain-gauge, inserted in an inner layer thereof, because the hyper-redundant tactile sensor system of the present disclosure contributes to the structural integrity of the resultant structure, instead of adding weight and reducing the structural integrity thereof as would occur when a conventional sensor (e.g., a strain gauge) is incorporated into an inner layer of a layered structure. Furthermore, conventional strain gauges are limited in size, unlike the carbon fiber sensor cells of the present disclosure. It is particularly important to ensure that the structural integrity of the part is maintained when the resultant structure is a composite part for an aircraft, e.g., a wing skin or spar.

Figure 1A:
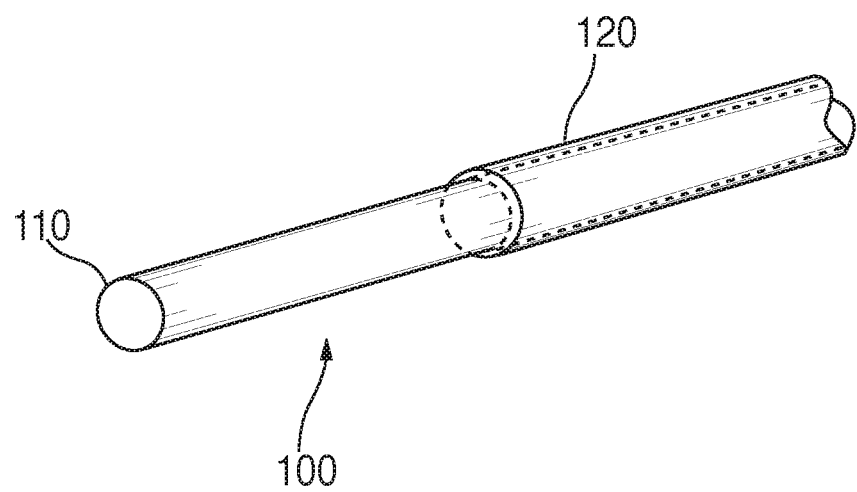
FIG. 1A is a perspective side view of a fiber sensor cell according to an embodiment of the present disclosure.
Figure 1B:
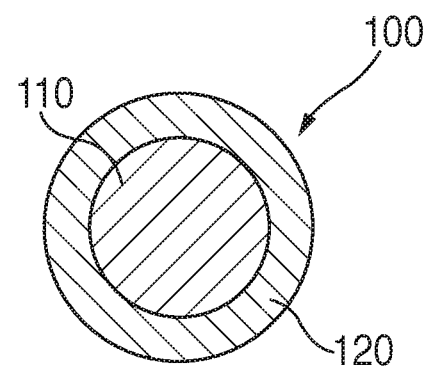
FIG. 1B is a diagram of a cross-sectional view thereof.

Referring now to FIGS. 1A and 1B, a fiber sensor cell 100 includes a fiber core 110 and an outer non-conductive layer 120. The inner fiber core 110 may consist of a carbon-graphite fiber, a carbon-nanotube fiber, a boron-nanotube fiber, or a boron-nitride-nanotube fiber. The inner fiber core 110 acts as a strain gauge because the resistance thereof will change upon any deflection of fiber core 110 based on the piezo-resistive effect on the carbon or boron conductor material. Piezoresistivity refers generally to a change in the electrical resistivity of an electrically conductive material as mechanical stresses are induced thereto. The outer non-conductive layer 120 insulates and thus isolates inner fiber core 110 from adjoining structures. Outer non-conductive layer 120 may be glass, for example, and may be applied using fiber-optic/glass coating processes (e.g., the Taylor Ulitovski process) as is known in the art. Fiber sensor cell 100 may have a length significantly longer than other types of stress sensors. In particular, each fiber sensor cell 100 may be as long as any ordinary fiber included in a composite structure.

When a group of fiber sensor cells 100 (either separately or as part of a tow) are integrated into a composite structure, such as a wing skin or a gripper of a robotic arm, immediate feedback of stresses within the composite structure can be obtained by monitoring the change in resistance across each of the fiber sensor cells 100. This feedback can allow closed loop control to be implemented to ensure that a wing skin or robot arm gripper does not exceed (or maintains) certain stress levels. Because of the density of fibers/tow in a composite structure, a plurality of fibers/tow can be used in parallel for redundancy or separate fibers can be monitored to improve the resolution of the stress measurement and/or location point. The ability to provide pressure/deflection feedback to a controller provided by a composite including a group of fiber sensor cells 100 has a wide number of applications. For example, aircraft that include shape-changing wing structures are currently being researched. By including fiber sensor cells 100 in the wing skin of such an aircraft, the pressure distribution on the wing skin may provide feedback that allows changes to parameters such as twist or dihedral to either improve efficiency or stave off an impending stall. In another example, by forming the gripper for a robotic arm from a composite including a group of fiber sensor cells 100, true tactile feedback may be provided ensuring that the forces provided in gripping an object are appropriate to maintain grip thereon without causing any damage thereto.

In composite structures having high risk portions (e.g., areas subject to greater stress level), a higher density of fiber sensor cells 100 may be provided to gain a higher fidelity measure of the stresses upon such portions. The location of the fiber sensor cells 100 within a composite structure is flexible and, since integrated within such structure, fiber sensor cells 100 may be positioned anywhere within the structure. Furthermore, since each fiber within a composite structure could be formed from a fiber sensor cell 100 (and given the extremely large number of such fibers in the composite structure), hyper-redundancy of fiber sensor cells 100 can be provided to average out noise or eliminate problems caused by failure of a single fiber sensor cell 100. Installation of the fiber sensor cells 100 disclosed herein into a composite structure can be integrated into existing composite manufacturing processes. For example, fiber sensor cells 100 can be applied in prepreg tape, laid up in sensor weaves/fabrics in place of normal structural fibers or can be applied to an existing structure. Furthermore, the fiber sensor cells 100 can be used in flexible/morphing structures to provide active/closed-loop feedback, to provide validation of composite structure models during testing thereof, or to provide stress measurement signals on an indicator available to a pilot (when installed on an aircraft structure). A group of the fiber sensor cells 100 installed in composite structure provides the ability to measure stress/strain and back out position and deflection to a high degree of certainty and a customizable level of redundancy or resolution.

Figure 2:
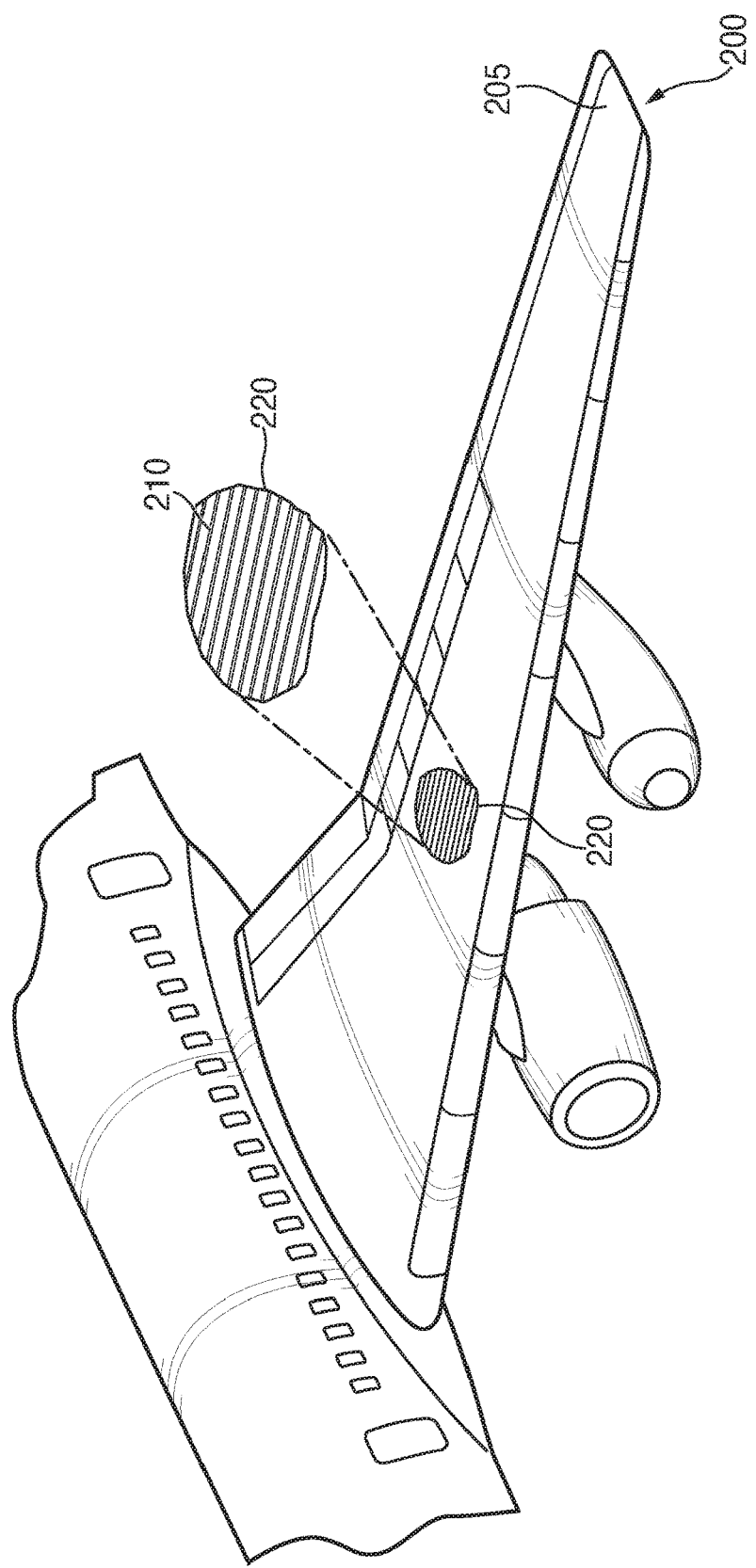
FIG. 2 is a diagram of a linear array of fiber sensor cells embedded in a composite structure according to one embodiment of the present disclosure.

Referring now to FIG. 2, an aircraft wing 200 is shown that has a composite skin 205 on the upper surface thereof. Composite skin 205 includes an internal layer, shown in detail in cut-out 220, that includes a plurality of fiber sensor cells 210 arranged in parallel to each other. The number of fiber sensor cells 210 included in the internal layer is arbitrary and may be selected, in one embodiment, to provide a predetermined resolution for the stresses measured by the fiber sensory cells. The orientation of the fiber sensor cells 210 is also arbitrary and may be selected to ensure that areas subjected to the greatest stresses are properly monitored.

Figure 3:
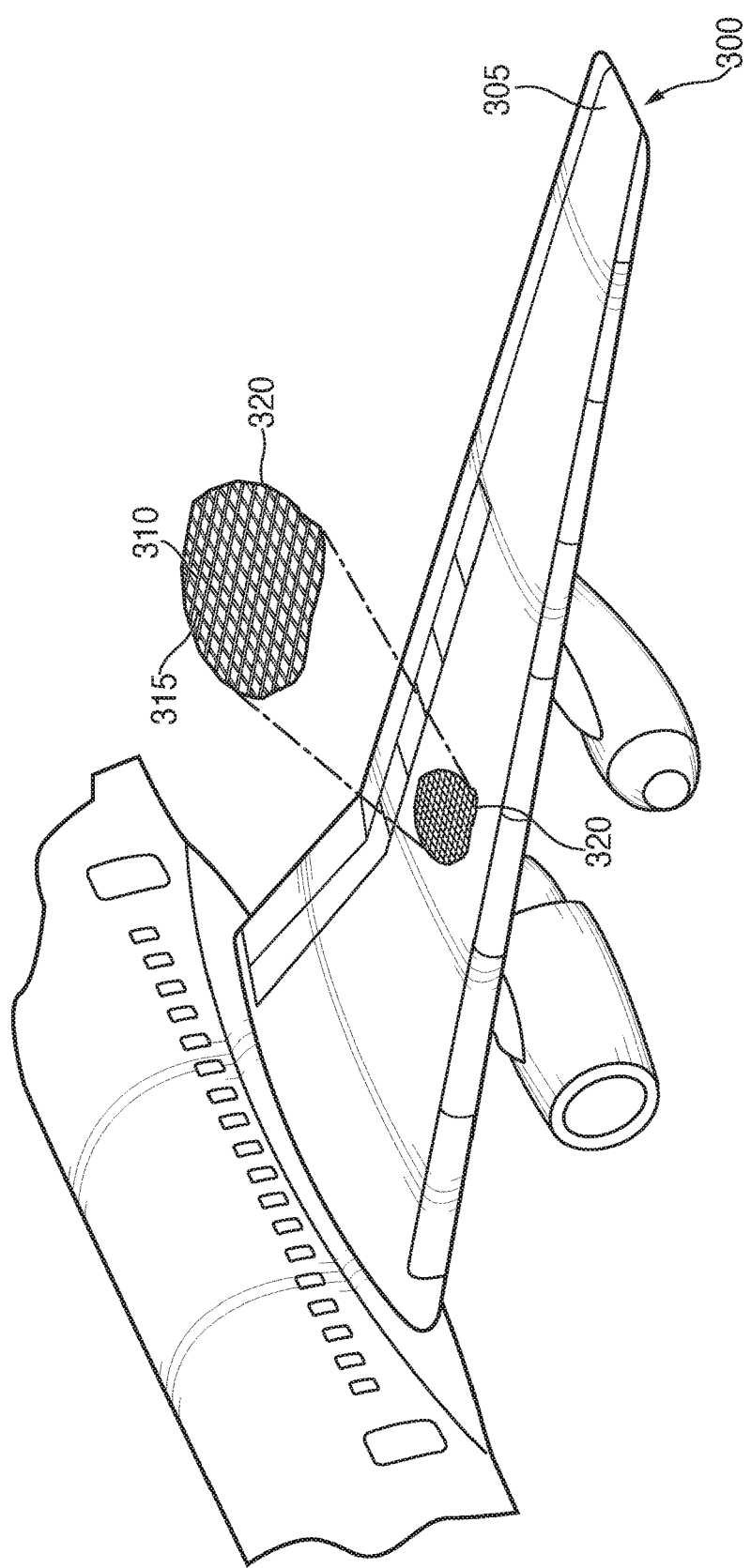
FIG. 3 is a diagram of a meshed array of fiber sensor cells embedded in a composite structure according to another embodiment of the present disclosure.

Referring now to FIG. 3, an aircraft wing 300 is shown that has a composite skin 305 on the upper surface thereof. Composite skin 305 includes an internal layer, shown in detail in cut-out 320, that includes a first plurality of fiber sensor cells 310 and a second plurality of fiber sensor cells 315 arranged in a weave pattern, with the first plurality of fiber sensor cells 310 positioned at a non-zero angle with respect to the second plurality of fiber sensor cells 315. As with the FIG. 3 embodiment, the number of fiber sensor cells 310, 315 included in the internal layer is arbitrary and may be selected, in one embodiment, to provide a predetermined resolution for the stresses measured by the fiber sensory cells. Also, the orientation of the fiber sensor cells 310, 315 is also arbitrary (so long as each fiber sensor cell 310 is parallel to each other fiber sensor cell 310 and at a non-zero angle with respect to each other fiber sensor cell 315) and may be selected to ensure that areas subjected to the greatest stresses are properly monitored. The weave pattern of fiber sensor cells 310, 315 shown in FIG. 3 provides the ability to identify particular locations of stress in the composite skin 305 and to quantify the amount of such stress. A weave pattern can also be used in other applications, such as a robotic arm gripper, to identify particular positions on the gripper having higher (or lower) levels of pressure thereon.

Figure 4:
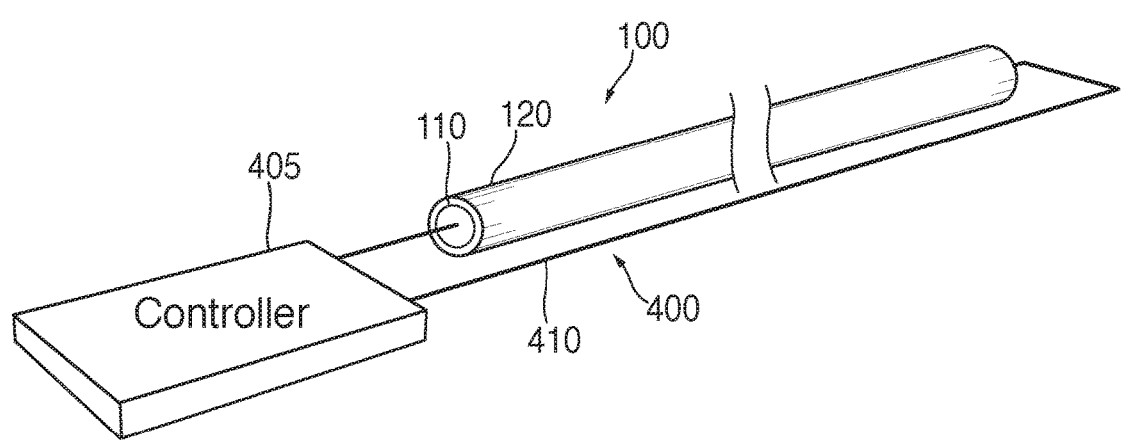
FIG. 4 is a diagram of a measurement system coupled to a fiber sensor cell according to embodiments of the present disclosure.

Referring to FIG. 4, a diagram of a control system 400 based on one or more fiber sensor cells 100 is shown. In particular, the fiber sensor cell 100 is coupled to a controller 405 via leads 410 coupled to the ends of the fiber core 110. The outer non-conductive layer 120 insulates fiber core 110 from other conductive structures. Although only one fiber sensor cell 100 is shown in FIG. 4, control system 400 may include a plurality of such fiber sensor cells 100. In one embodiment, controller 405 is configured to continuously monitor the resistance of fiber sensor cell 100 and to determine a measure of the stress imposed on fiber sensor cell 100 based on any change in such resistance. In another embodiment, controller 405 uses the resistance of fiber sensor cell 100 as an active feedback signal for use in controlling a particular process. For example, when a fiber sensor cell is part of a composite gripper for a robotic arm, controller 405 may use the resistance of fiber cell 100 to ensure that an adequate force is applied to a part held by the gripper to hold the part without breaking such part.

Figure 5A:
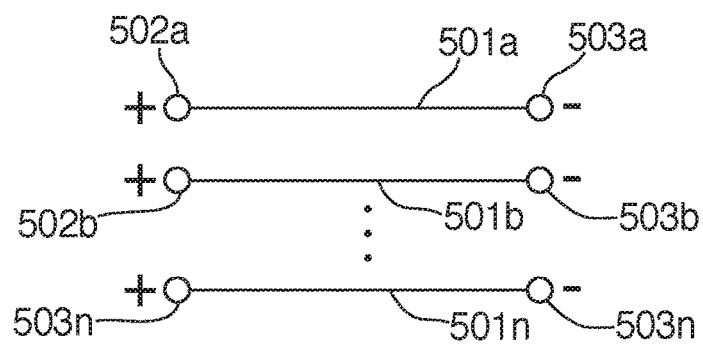
FIGS. 5A, 5B and 5C are diagrams of different connection methodologies for groups of fiber sensor cells according to embodiments of the present disclosure.

Although only one fiber sensor cell 100 is shown in FIG. 4, in practical application a composite structure will include a plurality of fiber sensor cells 100. As shown in FIG. 5A, a plurality of fiber sensor cells 501a, 501b to 501n (where n represents the total number of fiber sensor cells) are positioned parallel to each other, with each fiber sensor cell 501a, 501b, 501n having a first connection terminal 502a, 502b, 502n and a second connection terminal 503a, 503b, 503n. A controller may have separate lead pairs coupled to the associated terminals for each fiber sensor cell 501a, 501b, 501n in one embodiment. In an alternative embodiment, all of the first connection terminals 502a, 502b, 502n are coupled to a first lead and all of the second connection terminals 503a, 503b, 503n are coupled to a second lead such that a controller coupled to the first lead and the second lead monitors the parallel resistance combination of each fiber sensor cell 501a, 501b, 501n. In this latter configuration, the measurement signal is averaged across many fibers, so the amount of noise will be greatly reduced. Furthermore, the system will be more tolerant of individual sensor failures. The tradeoff is that this averaging effect will reduce the spatial resolution of the sensor, accuracy and sensitivity to localized damage, so the configuration must be tailored to the specific application.

Figure 5B:
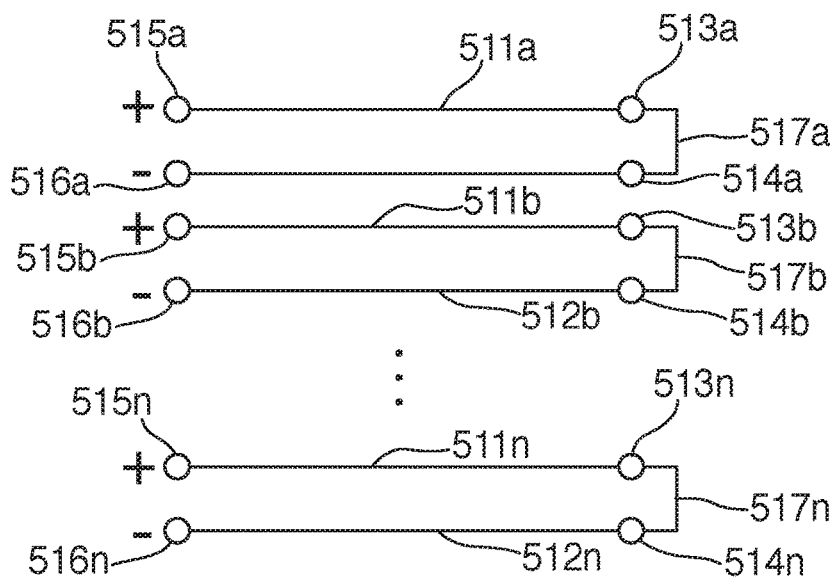

To reduce the length of leads coupled to the distal end of each fiber sensor cell, in an alternative embodiment shown in FIG. 5B, the fiber sensor cells may be arranged in pairs which each have connection terminals at the distal end coupled to each other. In particular, pairs of fiber sensor cell 511a, 512a, 511b, 512b to 511n, 512n (where n represents the total number of fiber sensor cells) have first (proximal) connection terminals 515a, 516a, 515b, 516b, 515n, 516n and second (distal) connection terminals 513a, 514a, 513b, 514b, 513n, 514n. The second (distal) connection terminals 513a, 514a, 513b, 514b, 513n, 514n for each associated pair of fiber sensor cell 511a, 512a, 511b, 512b to 511n, 512n are electrically coupled together with a jumper 517a, 517b, 517n. In this manner, the length of the leads between the controller and the connection terminals 515a, 516a, 515b, 516b, 515n, 516n can be greatly reduced. As with the FIG. 5A embodiment, separate lead pairs may be provided for each set of connection terminals 515a, 516a, 515b, 516b, 515n, 516n or a single set of lead pairs may be provided, with a first lead coupled to connection terminals 515a, 515b, 515n and a second lead coupled to connection terminals 516a, 516b, 516n.

Figure 5C:
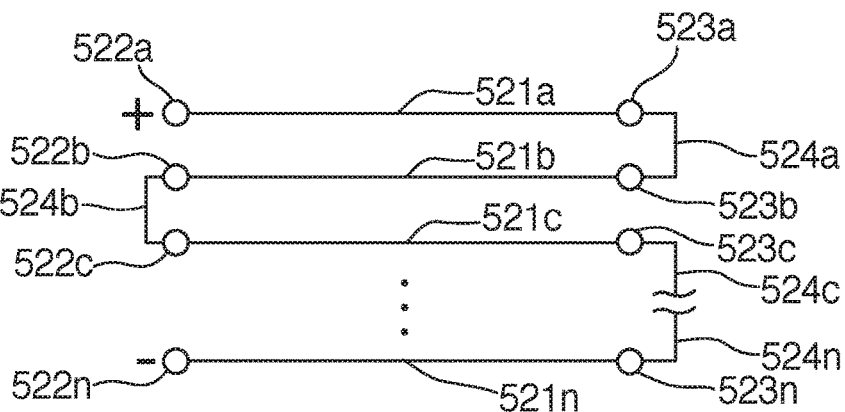

In a still further alternative embodiment shown in FIG. 5C, each of the fiber sensor cells 521a, 521b, 521c to 521n (where n represents the total number of fiber sensor cells) are coupled in serial fashion to a single lead pair. In particular, a jumper 524a electrically couples the distal terminals 523a, 523b, a jumper 524b electrically couples the proximal terminals 522b, 522c, a jumper 524c electrically couples distal terminal 523c and the next distal terminal (not shown), and a jumper 524m electrically couples a distal terminal (not shown) and distal terminal 523n. In this embodiment, a first lead of the single lead pair is coupled to terminal 522a and a second lead of the single lead pair is coupled to terminal 522n.

The embodiments of FIGS. 5A to 5C show fiber sensor cells arranged in a linear parallel fashion. As shown in FIG. 3 above, fiber sensor cells may also be arranged in a mesh pattern, with a first set of fiber sensor cells arranged in a linear parallel fashion and a second set of fiber sensor cells also arranged in linear parallel fashion at a non-zero angle with respect to the first set of fiber sensor cells. Each of the connection methods shown in FIGS. 5A to 5C may also be separately applied to each set of fiber sensor cells arranged in a mesh pattern.

The fiber sensor cells 100 disclosed herein provide a great advantage over prior stress sensing solutions for composite structures. First, since each of the fiber sensor cell 100 is embodiment within the composite structure itself, the signals generated by the fiber sensor cells 100 are more accurate than an externally places stress sensor (e.g., a strain gauge positioned on the surface of the composite structure). In addition, the fiber sensor cells 100 allow strain to be measured along long expanses of a part (e.g., the length of a wing skin formed from composite). This not possible with conventional stress sensors (e.g., strain gauges can only be used to measure local stresses in small areas).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A composite structure comprising:
    a plurality of layers, each layer of the plurality of layers comprising a plurality of fibers, wherein a first layer of the plurality of layers includes a plurality of fiber sensor cells distributed among a corresponding plurality of fibers, each fiber sensor cell of the plurality of fiber sensor cells comprising an inner fiber core and a non-conductive layer over the inner fiber core.

2. The composite structure of claim 1, wherein each fiber sensor cell of the plurality of fiber sensor cells is oriented parallel to each other fiber sensor cell of the plurality of fiber sensor cells.

3. The composite structure of claim 2, wherein the plurality of fiber sensor cells are electrically connected in parallel.

4. The composite structure of claim 1, wherein a first subset of the plurality of fiber sensor cells is oriented in a first direction and a second group a second subset of the plurality of fiber sensor cells is oriented in a second direction, and wherein the first direction is at a non-zero angle with respect to the second direction.

5. The composite structure of claim 4, wherein the plurality of fiber sensor cells are arranged in a manner that enables identification of stress locations in the composite structure and quantification of stress amounts at the stress locations.

6. The composite structure of claim 1, wherein the inner fiber core comprises carbon or boron.

7. The composite structure of claim 1, wherein the non-conductive layer comprises glass.

8. The composite structure of claim 1, wherein the composite structure is a skin for an aircraft wing.

9. The composite structure of claim 1, wherein the plurality of fiber sensor cells are electrically connected in series.

10. A system for measuring stress in a composite structure including an integral sensor network, the system comprising:
    a composite structure comprising a plurality of layers, each layer of the plurality of layers comprising a plurality of fibers, a first layer of the plurality of layers includes a plurality of fiber sensor cells distributed among a corresponding plurality of fibers, each fiber sensor cell of the plurality of fiber sensor cells comprising an inner fiber core and a non-conductive layer over the inner fiber core; and
    a controller electrically coupled to each fiber sensor cell of the plurality of fiber sensor cells, the controller configured to determine a level of stress in the composite structure based on a plurality of resistance levels of the plurality of fiber sensor cells, each resistance level of the plurality of resistance levels corresponding to a particular resistance level of a corresponding inner fiber core of each fiber sensor cell of the plurality of fiber sensor cells.

11. The system of claim 10, wherein each fiber sensor cell of the plurality of fiber sensor cells is oriented parallel to each other fiber sensor cell of the plurality of fiber sensor cells.

12. The system of claim 11, wherein the plurality of fiber sensor cells are electrically connected in parallel.

13. The system of claim 10, wherein a first subset of the plurality of fiber sensor cells is oriented in a first direction a second subset of the plurality of fiber sensor cells is oriented in a second direction, and wherein the first direction is at a non-zero angle with respect to the second direction.

14. The system of claim 13, wherein the plurality of fiber sensor cells are arranged in a manner that enables identification of stress locations in the composite structure and quantification of stress amounts at the stress locations.

15. The system of claim 10, wherein the inner fiber core comprises carbon.

16. The system of claim 10, wherein the non-conductive layer comprises glass.

17. The system of claim 10, wherein the composite structure is a skin for an aircraft wing.

18. The system of claim 10, wherein the inner fiber core comprises boron.

19. A method of measuring stress in a composite structure, the composite structure comprising a plurality of layers, each layer of the plurality of layers comprising a plurality of fibers, a first layer of the plurality of layers includes a plurality of fiber sensor cells distributed among a corresponding plurality of fibers, each fiber sensor cell of the plurality of fiber sensor cells comprising an inner fiber core and a non-conductive layer over the inner fiber core, the method comprising:
    monitoring a plurality of resistance levels of the plurality of fiber sensor cells, each resistance level of the plurality of resistance levels corresponding to a particular resistance level of a corresponding inner fiber core of each fiber sensor cell of the plurality of fiber sensor cells; and
    determining a stress level in the composite structure based on the plurality of resistance levels.

20. The method of claim 19, wherein the stress level is determined based on a combination of the plurality of resistance levels, wherein the combination of the plurality of resistance levels is based on a total resistance level of the plurality of fiber sensor cells connected in parallel.

* * * * *